J. E. SMITH.
Improvement in Electrical Pole Changers.

No. 129,867. Patented July 23, 1872.

Witnesses:

J. E. Smith.

UNITED STATES PATENT OFFICE.

JOHN E. SMITH, OF NEW YORK, N. Y.

IMPROVEMENT IN ELECTRICAL POLE-CHANGERS.

Specification forming part of Letters Patent No. 129,867, dated July 23, 1872.

*To all whom it may concern:*

Be it known that I, JOHN E. SMITH, of the city, county, and State of New York, have invented a new and useful Improvement in Pole-Changers for Electrical Apparatus; and I do hereby declare that the following is a full, clear, and exact description of the same, reference being had to the accompanying drawing forming part of this specification, and in which—

Figure 1:
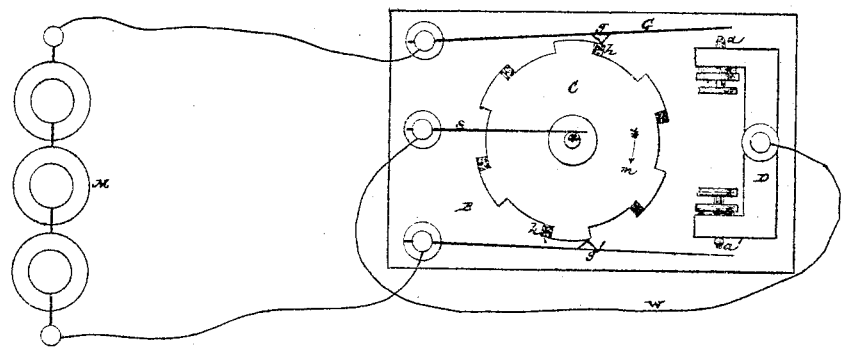
Figure 2:
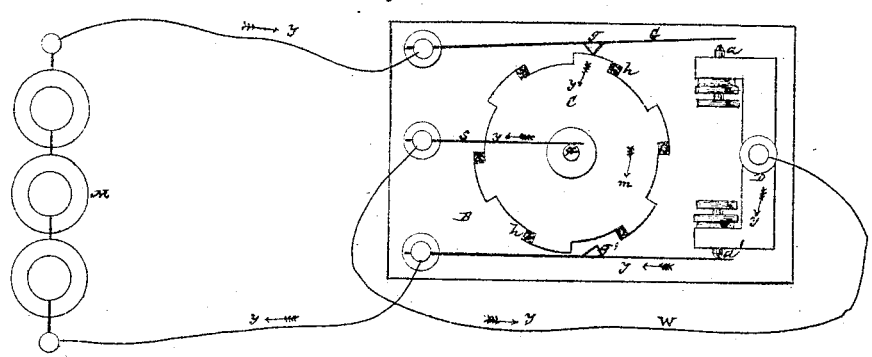
Figure 3:
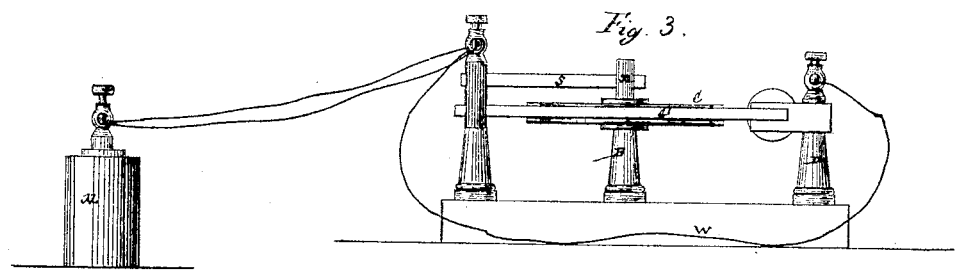

Figures 1 and 2 represent plan views of my improved pole-changer in connection with a battery and the circuit to be operated upon, said views showing the operating parts in different working positions. Fig. 3 is a side view of the same; and Fig. 4, a plan, showing a modified construction of the pole-changer.

Similar letters of reference indicate corresponding parts.

This invention is more particularly designed to be applied to a pole-changer or current-reverser, composed, mainly, of a toothed wheel, springs for alternately making and breaking connection with the toothed surface of said wheel, and adjustable screws or points of alternate electrical contact with the springs, the whole being arranged so that the pole-changer is made to operate by two rubbing and two direct-pressure electrical connections, substantially as described in Letters Patent No. 127,809, issued to me June 11, A. D. 1872. The improvement consists in a novel construction of the rubbing electrical connections of the pole-changer—that is, either the teeth of the wheel or the projections from the springs bearing thereon—by forming one or other of such rubbing-surfaces partly of a non-conductor of electricity, and so that they will act to interrupt the circuit at one of its connections before the circuit is closed at another point, whereby short-circuiting of the battery is avoided.

Referring, in the first instance, to Figs. 1, 2, and 3 of the drawing, C is the circuit-wheel, having any desired number of teeth. This wheel, which is of metal and supported by any suitable frame B, may be revolved by hand, clock-work, or other convenient power. Against its shaft $x$ a spring, $s$, presses in order to form electrical connection between the wheel C and the one end of the wire W, forming the circuit to be operated on; or the circuit may be attached to any part of the metallic frame which supports the wheel. M is a battery having one of its poles connected with a metallic spring, G, which makes intermittent connection with the teeth of the wheel C and with an adjustable point or screw, $a$. A similar spring, G′, which is arranged to operate in like manner on the wheel C, and on an adjustable point or screw, $a'$, connects with the other pole of the battery M. These screws $a\ a'$ are carried by an insulated metallic support, D, which has connected with it the other end of the circuit-wire W. The springs G G′ have projections $g\ g'$ for making intermittent contact with the wheel C as the latter rotates. These projections are so located that when one rests on the center of a tooth the other falls in the center of a space.

The general operation of the pole-changer to reverse the current over the wire to which it is applied being the same as in the pole-changer previously patented by me, as hereinbefore referred to, no special description of the same will here be necessary.

To explain the improvement it should be observed that if the teeth of the wheel C be wholly metallic, and as wide as or wider than the spaces between them, then, at certain intervals, or during a portion of the time, both springs G G′ will form electrical contact with said wheel at the same instant, thus short-circuiting the battery M. If, on the contrary, the teeth be narrower than the spaces, then there will be a moment when neither of said springs can touch the teeth of the wheel C; consequently a short circuit will be formed through the screws $a\ a'$ and support D. To obviate this I make the teeth of the wheel C a little wider than the spaces, thereby rendering it impossible for both springs G G′ to touch their respective screws $a\ a'$ at the same instant, and form the front part of each tooth of the wheel C, or that portion of it which first touches said springs, of some insulating material, leaving the metallic portion of said teeth a little narrower than the spaces, so that said springs cannot both form electrical contact with the wheel C at the same moment. The non-conducting portions of the teeth are represented by the dark parts $h\ h$.

Figure 4:
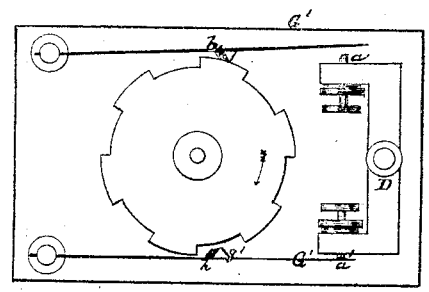

By reference to Fig. 1, supposing the wheel C to rotate, as indicated by the arrow $m$, it will be seen that the non-conducting portions of the teeth lift the springs G G′ from the screws $a$ $a'$ before said springs or their projections $g$ $g'$ connect with the metallic portions of the teeth. It will also be seen that when the projection $g$ is reached by the conducting part of a tooth the projection $g'$ will have fallen into a space between the teeth. When the wheel C is in the position shown in Fig. 1, no current flows from the battery, because both of the connections made by the spring G are broken. Fig. 2 represents the wheel C in a position to send a current through the route designated by arrows $y$. Instead of constructing each of the teeth partly of a non-conductor, $h$, the short-circuiting of the battery can be overcome in like manner by making that part of the projections $g$ $g'$ of the two springs which is first touched by the teeth of a non-conductor, $h$, as shown in Fig. 4 of the drawing. In either case it is the rubbing electrical connections that have the non-conductors applied to them.

What is here claimed, and desired to be secured by Letters Patent, is—

In a pole-changer operating by distinct rubbing and direct-pressure electrical connections, substantially as herein described, the construction of the rubbing electrical connections in part of a non-conductor, essentially as and for the purpose herein set forth.

J. E. SMITH.

Witnesses:
FRED. HAYNES,
FERD. TUSCH.